No. 696,477. Patented Apr. 1, 1902.
E. J. PENNINGTON.
AUTOMOBILE.
(Application filed June 22, 1901.)
(No Model.) 2 Sheets—Sheet 1.

Witnesses
Inventor
Edward J. Pennington,

No. 696,477. Patented Apr. 1, 1902.
E. J. PENNINGTON.
AUTOMOBILE.
(Application filed June 22, 1901.)
(No Model.) 2 Sheets—Sheet 2.
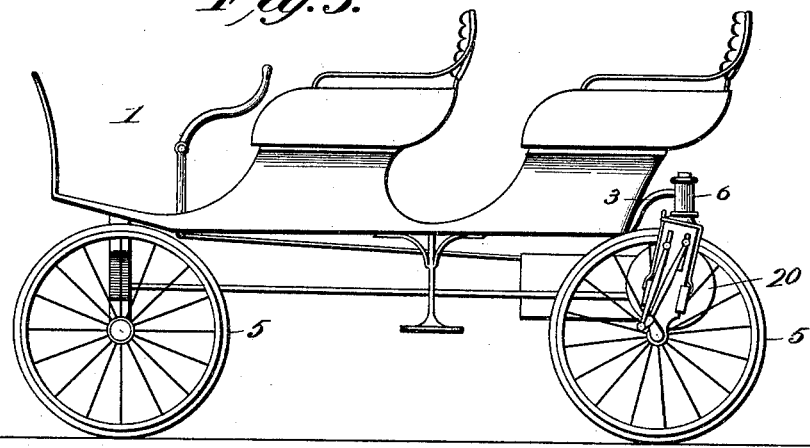
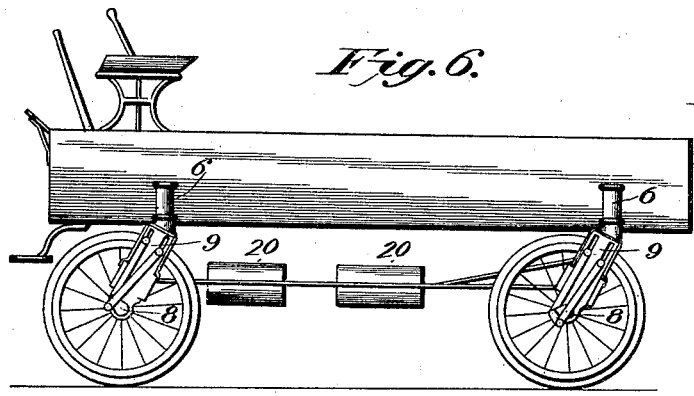
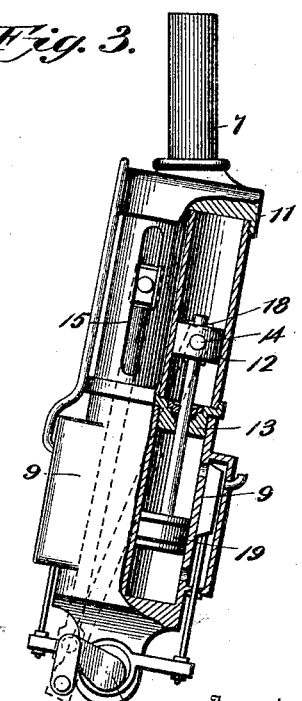
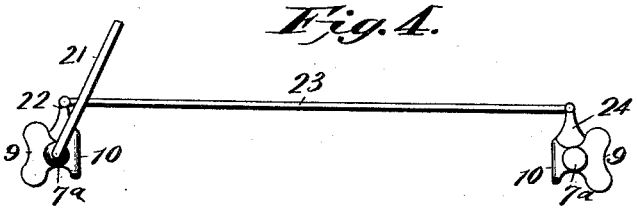
Witnesses
C. H. Walker.
J. T. Walker.
Inventor
Edward J. Pennington,
By
Attorneys
THE NORRIS PETERS CO., PHOTO-LITHO., WASHINGTON, D. C.

UNITED STATES PATENT OFFICE.

EDWARD J. PENNINGTON, OF LONDON, ENGLAND, ASSIGNOR OF ONE-HALF TO J. W. PLANK AND GEORGE EDWARD MILLS, OF CARLISLE, PENNSYLVANIA.

AUTOMOBILE.

SPECIFICATION forming part of Letters Patent No. 696,477, dated April 1, 1902.

Application filed June 22, 1901. Serial No. 65,721. (No model.)

*To all whom it may concern:*

Be it known that I, EDWARD J. PENNINGTON, a citizen of the United States, residing at the Hotel Metropole, London, England, have invented new and useful Improvements in Automobiles, of which the following is a specification.

My invention relates more particularly to improvements in an automobile the motive power of which is preferably obtained from steam, but it is apparent the invention is equally applicable to a vehicle driven by gasolene, electricity, compressed air, or other agency.

In carrying out my invention in its preferred form I place a motor on each of the two front wheels of the vehicle, driving each wheel directly without the intervention of gearing, thus gaining strength, simplicity, and cheapness of construction without that loss of power which arises from friction in the transmission of power when belt, chain, or other methods of gearing are employed. I also place adjacently to the motor a generator of motive force, as a steam-boiler, tank, battery, or the like.

The motor may be of a compound type for each wheel—that is to say, two, or what may be termed "twin," cylinders may be used with each wheel, and instead of mounting the motor with the two front wheels of the vehicle they may be placed on or adjacent to the rear wheels, or each of the four wheels of the vehicle may be supplied with an independent motor. Preferably, however, my invention contemplates the placing of the motor on each of the two front wheels, an important feature of novelty being that the invention permits the transformation of an ordinary vehicle constructed to be drawn by horse-power into an automobile or motor-driven vehicle in a ready and convenient manner and without change in the general construction of the vehicle except the removal of the front axle and wheels and the substitution therefor of a structure upon which the several parts entering into my invention are mounted. Each driving-wheel is placed in a fork in substantially the same way as the front wheel of an ordinary bicycle, the forks being coupled together, so that they may be controlled and worked simultaneously by means of the tiller or other steering device.

Figure 1:
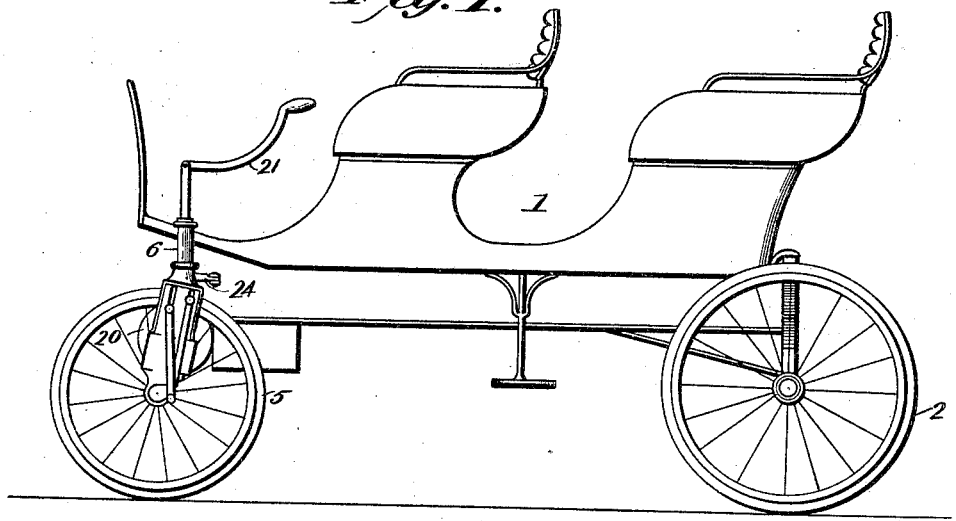
Figure 2:
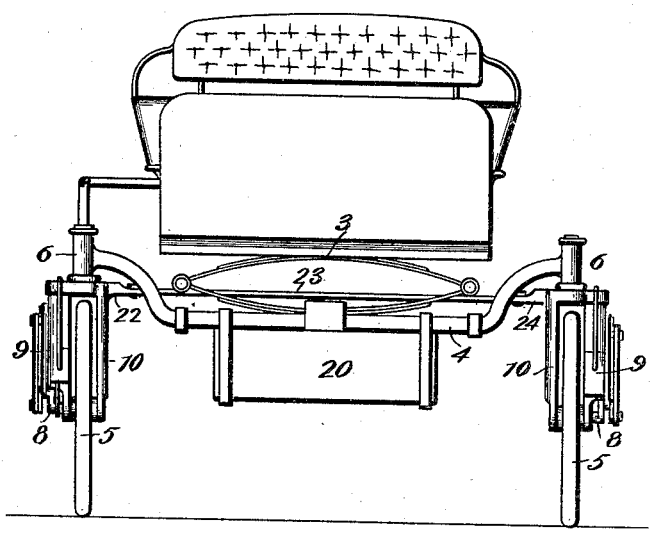

In the accompanying drawings, Figure 1 is a side elevation of a vehicle to which my invention in its preferred form is applied. Fig. 2 is a front view of the same. Figs. 3 and 4 show details; and Figs. 5, 6, and 7 modifications, as hereinafter described.

Similar numerals of reference indicate similar parts in the respective figures.

1 1 may represent generally the body of a four-wheel vehicle of any approved type, of which 5 5, &c., are the wheels. The invention is applicable to any type of vehicle—as, for instance, the Victoria for summer use or Brougham for winter—being capable of use interchangeably for any ordinary style of carriage. As shown by Figs. 1 and 2 of the drawings, the front axle of an ordinary vehicle has been removed and features of my invention substituted therefor. A support 3 of suitable material and size is attached at that point of the vehicle to which the front axle is ordinarily secured, to which support my improved front or substitute axle 4, carrying the front wheels 5 5, is detachably united. The front or substitute axle 4 and the other parts entering into my herein-described structure, wherever feasible, consist of steel tubing, because of its comparative lightness, strength, and cheapness.

Figure 7:
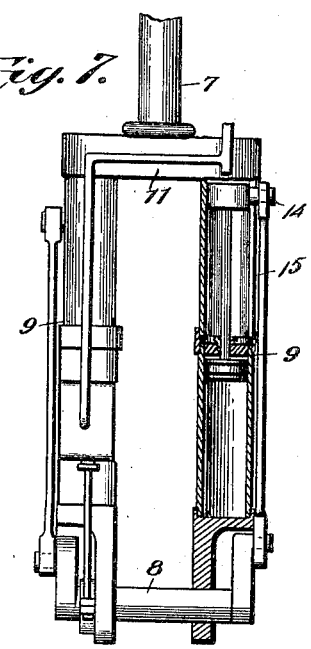

The front or substitute axle, mounted, as stated, upon the support 3, is provided at each end with a sleeve 6, which receives the fork-standard 7. The fork-standard is of peculiar construction, including, preferably, the member 7ª, which constitutes one of the bearings of the crank-shaft 8, the corresponding member of the fork, forming the other bearing for the crank-shaft, consisting of the motor cylinder or cylinders 9. (See Fig. 3.) The fork, except as to the part thereof composed of the cylinder or cylinders, is preferably integral throughout, while the cylinder or cylinders forming a part of said fork are attached to the member 10 by a threaded union, as shown at 11. In Fig. 7 the fork is constructed with a cylinder at each side, each cylinder constituting a member of the fork proper. The cylinder or cylinders 9 are closed at their lower ends in any suitable manner, the closure being bored so as to constitute a bearing for the crank-shaft 8. In the drawings two cylinders are represented for each wheel, the bearing for the crank-shaft 8 being in the longitudinal center line of the assembled pair of cylinders.

Each cylinder at its upper end is furnished with a neatly-fitting cylindrically-formed cross-head 12, through which passes the connecting-rod pin 14. For a length equal to that of the stroke of the piston each cylinder is slotted, as at 15, to permit the movement of its connecting-rod pin, which extends beyond the outer peripheral limit of the cylinder. The operative length of each cylinder is limited by its head 13, which has an exterior screw-thread which fits the internal screw-threaded portion of the cylinder. The head 13 of each cylinder is provided with a suitable gland and rod packing and made of sufficient depth to constitute a substantial bearing for the piston-rod 17, which is keyed at its upper end, as shown by 18, and at its lower end is secured to the piston 19, which may be of an ordinary or approved construction.

The crank, as seen in Fig. 3, is provided with a pin for each connecting-rod, the pins having the angular arrangement shown, so as to give one cylinder in operation a lead over the other, as will be readily understood. Any suitable valvular device may be employed; but as such does not form in detail a part of my present invention it is here shown generally by 19$^a$.

Assuming that the motive power employed is steam, I provide a generator or boiler 20, which may be suspended from the front axle 4 or otherwise appropriately placed. My present invention does not extend to the details of construction entering into the boiler here indicated; but it is sufficient to say that it partakes of the sectional and tubular character, whereby the most extended heating area may be obtained in the smallest compass, and that the boiler is combined with suitable water-tanks and liquid fuel and other necessary apparatus which need not be here described, the boiler and its appurtenances being represented as a whole, as aforesaid, by 20. Suitable flexible tubing is provided connecting the cylinders 9 with the boiler 20. It will be thus seen that the front axle 4, which, as stated, is used as a substitute for the ordinary front axle of a vehicle, carries all the parts necessary to transform such vehicle, adapted to be drawn by horse-power, into an automobile and that, the width of wheel-thread and size of wheels admitting, the structure as an entirety may be used interchangeably with vehicles of various types.

The steering of the vehicle herein described, as will be understood, is accomplished by coincident rotary movement of the fork standards or pillars 7 within the sleeves 6. This movement may be effected in a variety of ways; but I have shown (see particularly Fig. 4) suitable means whereby two fork standards or pillars 7 may be simultaneously operated. Thus 21 represents a steering-handle, which extends backward in convenient reach of the driver and connects with one of the fork-standards, preferably that at the right, while 22 shows an arm projecting from the same fork-standard, connecting with a rod 23, which in turn is attached to an arm 24, secured to the other fork-standard. In Fig. 5 a structure or arrangement similar to that hereinabove described is applied to the two rear wheels of a vehicle, it being understood that the steering is here accomplished by operating said rear wheels, the front wheels being secured against a pivotal movement.

In vehicles of the heavier class, as for conveying goods and merchandise or such as might act as a traction-engine to draw other loaded vehicles, a motor or motors (see Fig. 6) may be placed on each of the four wheels, each wheel being disposed in a fork, of which the motor or motors form a part, as described, and one pair of wheels would generally be used as the steering-wheels; but it is obvious that the several forks could be coupled up to a common steering-center and all the wheels operate simultaneously.

Instead of using the cylinders either on one or both sides of the wheel as part of the fork and giving the bearing for the crank-shaft of the motor and wheel I can use ordinary forks and attach the driving-cylinders thereto at any desired angle.

While I have more particularly described and shown a generator of power consisting of a steam-boiler, I wish it to be understood that any other generator or distributer of power, as a battery, compressed-air tank, or a tank for holding gasolene or other fluids for supplying the cylinders of an explosion-engine, would be the equivalent of the boiler inasmuch as the generator or distributer of whatever character would be located and bear the same relation to the motors as herein indicated.

My invention, as will be apparent, admits of changes in details, and such changes as may suggest themselves to the skilled mechanic without the exercise of invention I claim as fully within the terms of my improvement.

I claim—

1. In an automobile, the combination of driving-wheels, a swiveled fork-union for each driving-wheel, motor-cylinders forming parts of the fork and connected with said union, a crank-shaft having bearings in closures of said cylinders, said shaft having cranks angularly arranged, a piston-rod and a cross-head for each cylinder, and connections between the cross-heads and the cranks, substantially as set forth.

2. In an automobile, the combination of driving-wheels, a swiveled fork-union for each driving-wheel, motor-cylinders forming parts of the fork and connected with said union, a crank-shaft having bearings in closures of said cylinders, said shaft having cranks angularly arranged, a piston-rod and a cross-head for each cylinder, connections between the cross-heads and the cranks, and steering devices for said wheels, substantially as set forth.

3. In an automobile, the combination of driving-wheels, a swiveled fork-union for each driving-wheel, motor-cylinders forming parts of the fork and connected with said union, a crank-shaft having bearings in closures of said cylinders, said shaft having cranks angularly arranged, a piston-rod and a cross-head for each cylinder, connections between the cross-heads and the cranks, and means for coupling up the several forks to a common steering-center, substantially as set forth.

In testimony whereof I affix my signature in presence of two witnesses.

EDWARD J. PENNINGTON.

Witnesses:
   GEORGE H. HOWARD,
   JOHN B. TOBIN.